(12) United States Patent
Bezemer et al.

(10) Patent No.: US 7,998,899 B2
(45) Date of Patent: Aug. 16, 2011

(54) CATALYST WITH SUPPORT STRUCTURE

(75) Inventors: Gerrit Leendert Bezemer, Amsterdam (NL); Hans Peter Alexander Calis, The Hague (NL); Ronald Jan Dogterom, Amsterdam (NL)

(73) Assignee: Shell Oil Company, Houston, TX (US)

( * ) Notice: Subject to any disclaimer, the term of this patent is extended or adjusted under 35 U.S.C. 154(b) by 346 days.

(21) Appl. No.: 12/277,651

(22) Filed: Nov. 25, 2008

(65) Prior Publication Data

US 2009/0270518 A1    Oct. 29, 2009

(30) Foreign Application Priority Data

Nov. 27, 2007    (EP) .................................... 07121616

(51) Int. Cl.
*B01J 23/00* (2006.01)
*B01J 21/00* (2006.01)
*B01J 20/00* (2006.01)

(52) U.S. Cl. ...................... 502/439; 502/300; 502/527.2

(58) Field of Classification Search .................. 502/327, 502/332, 333, 334, 339, 355, 415, 439, 527.2, 502/300

See application file for complete search history.

(56) References Cited

U.S. PATENT DOCUMENTS

| | | | | |
|---|---|---|---|---|
| 1,927,508 | A * | 9/1933 | Titlestad et al. ............. | 502/339 |
| 3,189,563 | A * | 6/1965 | Hauel ............................ | 422/177 |
| 3,711,385 | A * | 1/1973 | Beer .............................. | 205/464 |
| 3,915,898 | A * | 10/1975 | Acres et al. .................... | 502/315 |
| 3,994,831 | A | 11/1976 | Betz .............................. | 252/458 |
| 4,110,418 | A | 8/1978 | Martin .......................... | 261/98 |
| 4,464,482 | A * | 8/1984 | Bird et al. ...................... | 502/325 |
| 4,530,918 | A | 7/1985 | Sambrook et al. ............ | 502/303 |
| 4,645,754 | A | 2/1987 | Tamura et al. ................ | 502/527 |
| 4,731,229 | A | 3/1988 | Sperandio ..................... | 422/188 |
| 4,863,893 | A * | 9/1989 | Farrauto et al. ............... | 502/325 |
| 5,232,891 | A * | 8/1993 | Hormann et al. ............. | 502/326 |
| 5,259,435 | A * | 11/1993 | Miura et al. ................... | 164/97 |
| 5,262,145 | A * | 11/1993 | Agrawal et al. ............... | 423/372 |
| 5,431,890 | A * | 7/1995 | Crossland et al. ............ | 422/211 |
| 5,674,460 | A | 10/1997 | Plog et al. ..................... | 422/177 |
| 6,288,008 | B1 * | 9/2001 | Matsumoto ................... | 502/439 |
| 6,624,114 | B1 | 9/2003 | Eberle et al. .................. | 502/439 |
| 6,699,540 | B1 * | 3/2004 | Tsukamoto ................... | 428/34.1 |

FOREIGN PATENT DOCUMENTS

| | | |
|---|---|---|
| DE | 4334981 | 4/1995 |
| DE | 19904398 | 8/2000 |
| EP | 0021736 | 1/1981 |
| EP | 0082614 | 6/1983 |
| EP | 0464633 | 1/1992 |
| EP | 1108470 | 6/2001 |
| EP | 1570904 | 9/2005 |
| GB | 1446175 | 8/1976 |
| JP | 169319 | 6/2005 |
| WO | WO9205870 | 4/1992 |
| WO | WO9306041 | 4/1993 |
| WO | WO0207882 | 1/2002 |
| WO | WO2004014549 | 2/2004 |

OTHER PUBLICATIONS

Oil and Gas Journal, vol. 69, No. 36, Sep. 6, 1971, pp. 86-90.

\* cited by examiner

*Primary Examiner* — Cam N. Nguyen

(57) ABSTRACT

The present invention provides a catalyst carrier, catalyst and catalyst precursor comprising a refractory metal oxide and support structure comprising a wire gauze having between $100^2$ to $600^2$ openings per $inch^2$, and having a wire thickness in the range of 20 micrometer to 110 micrometer. The volume of the support structure is less than 50% of the volume of the catalyst carrier and at least 70% of said openings are filled with the refractory metal oxide.

14 Claims, No Drawings

US 7,998,899 B2

CATALYST WITH SUPPORT STRUCTURE

This application claims the benefit of European Application No. 07121616.2 filed Nov. 27, 2007.

FIELD OF THE INVENTION

This invention relates to a catalyst carrier, a catalyst, and a catalyst precursor, comprising a support structure. The invention further relates to the use of a catalyst carrier, a catalyst, and a catalyst precursor. The catalyst may be used to catalyse a number of different reactions including a Fischer-Tropsch reaction.

BACKGROUND OF THE INVENTION

The Fischer-Tropsch process can be used for the conversion of hydrocarbonaceous feed stocks into liquid and/or solid hydrocarbons. The feed stock (e.g. natural gas, associated gas and/or coal-bed methane, coal) is converted in a first step into a mixture of hydrogen and carbon monoxide (this mixture is often referred to as synthesis gas or syngas). The synthesis gas is then converted in one or more steps over a suitable catalyst at elevated temperature and pressure into paraffinic compounds ranging from methane to high molecular weight molecules comprising up to 200 carbon atoms, or, under particular circumstances, even more.

Numerous types of reactor systems have been developed for carrying out the Fischer-Tropsch reaction. For example, Fischer-Tropsch reactor systems include fixed bed reactors, especially multi tubular fixed bed reactors, fluidized bed reactors, such as entrained fluidized bed reactors and fixed fluidized bed reactors, and slurry bed reactors such as three-phase slurry bubble columns and ebulated bed reactors.

The catalyst used in a (multi tubular) fixed bed Fischer-Tropsch reactor is often formed by extrusion. While this allows a variety of shapes to be made, the extrudate produced is limited and in practice only the cross section shape of the extrudate can be varied. Another limitation is the sizing of such particles. The optimum thickness of catalyst for fixed bed Fischer-Tropsch reactors is around 200 μm in view of diffusion limitations. However catalyst particles of such a thickness are too weak and break during reactor loading and cannot carry the weight of the reactor bed above.

The catalyst used in a fixed fluidized bed Fischer-Tropsch reactor often is a coated substrate, for example a coated metal substrate such as a coated metal sponge or a coated metal wire structure. The weight of a (metal) substrate and the loss of reactor space is a concern. In certain applications it would be desirable to have less space occupied by the substrate, and lower internal voidage to make optimal use of the reactor space.

SUMMARY OF THE INVENTION

According to a first aspect of the present invention there is provided a catalyst carrier comprising:

a support structure comprising a wire gauze having between $100^2$ to $600^2$ openings per $inch^2$, and having a wire thickness in the range of 20 micrometer to 110 micrometer; and a refractory metal oxide;

wherein the volume of the support structure is less than 50% of the volume of the catalyst carrier and at least 70% of said openings are filled with the refractory metal oxide.

According to a second aspect of the present invention there is provided a catalyst or catalyst precursor comprising:

a support structure comprising a wire gauze having between $100^2$ to $600^2$ openings per $inch^2$, and having a wire thickness in the range of 20 micrometer to 110 micrometer; and a refractory metal oxide; and a catalytically active metal or precursor therefor;

wherein the volume of the support structure is less than 50% of the volume of the catalyst carrier and at least 70% of said openings are filled with the refractory metal oxide. In this aspect of the present invention the support structure together with the refractory metal oxide form the catalyst carrier for the catalytically active metal or precursor therefor.

DETAILED DESCRIPTION OF THE INVENTION

One advantage of a catalyst carrier, catalyst and catalyst precursor according to the present invention is that these are relatively strong. The catalyst carrier, catalyst and catalyst precursor according to the present invention can, for example, be used in fixed bed reactors, especially in multi tubular fixed bed reactors. They are less susceptible to breakages during reactor loading as compared to extrudates with the same thickness. Another advantage is that relatively thin catalysts and catalyst precursors can be prepared which are able to carry the weight of the reactor bed above.

Another advantage of a catalyst carrier, catalyst and catalyst precursor according to the present invention is that these can be used in, among others, ebullated bed and fixed slurry bed reactors whereby less space is occupied by the substrate, and whereby the internal voidage is lower as compared to traditional coated substrates.

A further advantage of a catalyst carrier, catalyst and catalyst precursor according to the present invention is that catalysts with a very high activity can be prepared. Especially catalyst carriers, catalysts and catalyst precursors that are suitable for Fischer Tropsch and which have a very high activity can be prepared.

Another advantage is that Fischer Tropsch catalysts with a relatively high selectivity towards C5+ hydrocarbons can be prepared. Another advantage is that Fischer Tropsch catalysts can be prepared which show a very low $CO_2$ production.

Preferably the support structure consists of the wire gauze.

A catalyst precursor generally comprises a precursor for a catalytically active metal. After oxidation and/or reduction a catalyst can then be obtained. The catalyst comprises a catalytically active metal.

For example, a catalytically active metal suitable for Fischer Tropsch is cobalt. Cobalt may be added to the titania carrier in the form of, for example, cobalt hydroxide, CoOOH, cobalt oxide, a co-precipitate of cobalt and manganese hydroxide, a cobalt nitrite, or a cobalt ammonium complex, for example cobalt ammonium carbonate. Such forms of cobalt are precursors of the catalytically active metallic cobalt.

The gauze structure has between $100^2$ to $600^2$ openings per $inch^2$; hence the gauze structure has 1550 to 55800 openings per $cm^2$. Preferably the wire gauze structure has 2000 to 40000, more preferably 2500 to 30000, even more preferably 3000 to 20000 openings per $cm^2$.

The size of these openings preferably is in the range of from 280 $\mu m^2$ to 24000 $\mu m^2$, more preferably 600 $\mu m^2$ to 20000 $\mu m^2$, even more preferably 1400 $\mu m^2$ to 10000 $\mu m^2$, most preferably 1400 $\mu m^2$ to 5500 $\mu m^2$.

The wires of the gauze have a thickness of 20 micrometer to 110 micrometer. Where the wires cross over each other, the support structure has a total thickness in the range of 40 micrometer to 330 micrometer. After weaving, the thickness of the support structure at the place where the wires cross over each other may be up to 3 times as thick as the wire thickness. In one embodiment the gauze is woven and then pressed before it is used as a support structure in the present invention. In such a case the thickness of the support structure at the place where the wires cross over each other may be up to 2 times as thick as the wire thickness.

The thickness of a wire gauze structure at the place where the wires cross over each other may be determined using a caliper, for example a vernier caliper. The thickness of a wire gauze structure may alternatively or additionally be determined using a microscope or one or more photographs. The thickness of a wire may be determined using a micrometer or a caliper.

The wires of the wire gauze structure comprise a metal. Preferably the wire structure comprises stainless steel, such as stainless steel 310 or 316, iron, copper and/or aluminium, more preferably stainless steel.

The pattern of the gauze may be chosen. Examples of suitable patterns are "plain weave" (each wire passes in turn under and over another wire, the wire diameters are usually the same in both directions and the mesh apertures are either square or rectangular), "plain Dutch weave" and a "Dutch twill weave". Preferably the wire gauze has a "plain weave" structure.

The support structure may comprise a bended or twisted wire gauze structure.

The support structure preferably has a thickness in the range of from 20 micrometer to 330 micrometer. The surface of the support structure may have any size. The "surface of the support structure" can be determined, for example, by measuring the area that is covered by the support structure when it is put flat, with its largest side down, on a table or on squared paper. Preferably the support structure has a surface of at least 1 mm$^2$. Preferably the support structure has a surface of at most 1 cm$^2$.

Especially preferred is a support structure having a thickness in the range of from 20 micrometer to 330 micrometer and a longest internal straight length of at least 0.5 mm and at most 2 cm, more preferably at least 1 mm and at most 1 cm. The longest internal straight length is to be determined on a support structure in the shape in which it is used, for example flat, bended or twisted.

The support structure has between 100$^2$ to 600$^2$ openings per inch$^2$, or 1550 to 55800 openings per cm$^2$, and preferably 2000 to 40000, more preferably 2500 to 30000, even more preferably 3000 to 20000 openings per cm$^2$. At least 70% of said openings are filled with the refractory metal oxide. Preferably more than 80%, especially more than 90% of said openings are filled with the refractory metal oxide.

For the purposes of this document, the openings in the support structure are considered filled when the size of the openings following combination of the support structure with the refractory metal oxide, is equivalent to the size of the pores of the refractory metal oxide.

In one embodiment the size of the openings in the support structure is relatively large compared to pores in refractory metal oxide. In a preferred embodiment the size of the openings in the support structure is at least twice the size of the pores in the refractory metal oxide, more preferably at least 10 times the size, even more preferably at least 100 times the size, even more preferably at least 1000 times the size of the pores in the refractory metal oxide.

In a preferred embodiment a refractory metal oxide with pore sizes in the range of 2-200 nm, more preferably with pore sizes in the range of 40-60 nm is used. In one embodiment macro-porous refractory metal oxides with pore sizes larger than 200 nm, even up to 20 μm, may be used. One way of determining the pore size of a refractory metal oxide is to cut a sample, and then determine the diameter or longest length of the pores showing at the surface. This may be performed using an optical microscope, a scanning electron microscope, or a transmission electron microscope.

A variety of holes can be present in the support structure for certain embodiments of the invention. The structure preferably has between 1550 to 55800, preferably 2000 to 40000, more preferably 2500 to 30000, even more preferably 3000 to 20000 openings per cm$^2$, with a size in the range of from 280 μm$^2$ to 24000 μm$^2$, more preferably 600 μm$^2$ to 20000 μm$^2$, even more preferably 1400 μm$^2$ to 10000 μm$^2$, most preferably 1400 μm$^2$ to 5500 μm$^2$. The support structure preferably has a quite regular structure, that is, preferably at least 85% of the pores therein are within 5% of the average pore size. In addition to these holes, the structure may contain one or more larger holes.

For example, where the support structure is shaped as a ring, there is normally a single large hole of 1-5 mm inner diameter in the catalyst. Such a large hole is typically not filled with refractory oxide material. That is, after combination of the support structure with the refractory metal oxide, the size of the large opening is not equivalent to the size of the pores of the refractory metal oxide. Such a large hole may have some refractory metal oxide at the inside of the hole, especially at the edge of the hole. A catalyst carrier, catalyst or catalyst precursor comprising a support structure in the form of a ring with a single large hole, will itself have the shape of a ring with a single relatively large hole, though with slightly different dimensions due to the refractory metal oxide on the support structure.

Preferably a catalyst carrier particle, catalyst particle or catalyst precursor particle comprises one piece of support structure. Preferably the carrier, catalyst, or catalyst precursor comprises a single layer of the support structure. Preferably the support structure is a single piece, such as a continuous sheet of metal gauze.

The openings in the gauze are preferably regular and substantially straight edged, more preferably the openings are square shaped. The thickness of the wires of the gauze may be adjusted to the number of openings desired.

The support structure may be made by cutting a structure out from a larger piece of gauze. For example rings, squared, triangles, or hexagons, preferably with at least one large hole inside, may be cut out from gauze. The gauze, for example gauze rings, may be bended before the refractory metal oxide is applied to it.

The volume of the support structure is less than 50% of the volume of the catalyst carrier. Preferably the volume of the support structure is less than 30% of the volume of the catalyst carrier, more preferably less than 20%. Preferably the volume of the support structure is more than 15% of the volume of the catalyst carrier.

Preferably the thickness of the support structure is less than 50% of the overall thickness of the catalyst precursor.

More preferably the thickness of the support structure is less than 15%, especially less than 5% of the overall thickness of the catalyst precursor.

The total thickness of the catalyst carrier, catalyst or catalyst precursor preferably is less than 400 μm, more preferably less than 300 μm, even more preferably less than 200 μm. The total thickness of the catalyst carrier, catalyst or catalyst precursor preferably is more than 40 μm, more preferably more than 80 μm.

Preferably catalyst carrier material is applied to both sides of the gauze, whereby also a major portion of the holes in the support structure is filled. At least 70% of the openings in the wire gauze of a catalyst carrier, catalyst and catalyst precursor according to the present invention are filled with the refractory metal oxide.

Preferably at least 70 vol % of the support structure is embedded by the refractory metal oxide. Preferably more than 80 vol %, especially more than 90 vol % of the support structure is embedded by the refractory metal oxide.

Since the support structure is embedded in the refractory oxide, known problems of adherence between, for example, a metal and a refractory oxide may be mitigated.

The catalyst carrier, catalyst, and catalyst precursor may be provided in a variety of shapes, and made by a number of different techniques. In one embodiment the carrier, catalyst, or catalyst precursor has a width of more than 0.5 mm, or even more than 1 mm. Such a width is hard to obtain by means of extrusion, but very well possible for carriers, catalysts, and catalyst precursors according to the present invention.

In a preferred embodiment the carrier, catalyst, or catalyst precursor according to the present invention is provided as one or more strips with a length of at least four times the width. In another preferred embodiment the carrier, catalyst, or catalyst precursor according to the present invention is provided as a ring. The ring can itself be a variety of shapes—circular or polygonal—triangular, square, hexagonal etc. The rings may be saddle shaped or curved.

The refractory metal oxide preferably is silica, alumina, titania, zirconia, ceria, gallia, and/or mixtures thereof, most preferably silica or titania. In a preferred embodiment, the carrier material comprises a mixture of titania and zirconia.

In one embodiment an adhesive is added to the support structure and in a next step the refractory oxide is applied to the support structure. Any suitable adhesive may be used. As an example of a suitable adhesive can be mentioned: an ammonium salt of lactic acid titanate chelate, such as Tyzor® obtainable from DuPont.

To facilitate adhesion of the refractory metal oxide, the support structure can be cleaned and roughened before application of the refractory oxide, especially when the support structure comprises metal.

The refractory metal oxide may be applied to the porous support by means of spray coating, dip coating, or plasma coating. In other embodiments a paste comprising the refractory oxide is smeared onto the support structure. The refractory metal oxide may be applied to the porous support by means of roller coating.

When the refractory metal oxide is applied to the support structure it may contain a catalytically active metal or precursor therefor. For example, a mixture of the refractory metal oxide and a catalytically active metal or precursor therefor may be applied to the support structure. Alternatively, a catalytically active metal or precursor therefor may be applied at a later stage, for example via impregnation.

The catalyst carrier described herein is especially suitable as a carrier for a catalyst used in diffusion-limited reactions most especially the Fischer-Tropsch reaction, but also hydrocracking, and oxidative desulphurisation.

The catalyst described herein is especially suitable as a catalyst used in diffusion-limited reactions most especially the Fischer-Tropsch reaction, but also hydrocracking, and oxidative desulphurisation. The catalyst described herein is especially suitable as a catalyst used a Fischer-Tropsch reaction in a multitubular reactor.

A catalyst or catalyst precursor according to the present invention comprises a catalytically active metal or precursor therefor.

Catalysts used in the Fischer-Tropsch synthesis often comprise a carrier material and one or more metals from Group VIII of the Periodic Table, especially from the cobalt and iron groups, optionally in combination with one or more metal oxides and/or metals as promoters selected from zirconium, titanium, chromium, vanadium and manganese, especially manganese. A Fischer-Tropsch catalytically active metal or precursor preferably includes a metal such as cobalt, iron, nickel and ruthenium, more preferably cobalt.

References to "Groups" and the Periodic Table as used herein relate to the previous IUPAC version of the Periodic Table of Elements such as that described in the 68th Edition of the Handbook of Chemistry and Physics (CPC Press).

A hydro-cracking catalytically active metal or precursor preferably includes one or more metals selected from Groups VIB and VIII of the Periodic Table of Elements. Preferably, the hydrocracking catalysts contain one or more noble metals from Group VIII. Preferred noble metals are platinum, palladium, rhodium, ruthenium, iridium and osmium. Most preferred catalysts for use in the hydro-cracking stage are those comprising platinum.

The invention also provides a process for the production of liquid hydrocarbons from synthesis gas, the process comprising:

converting synthesis gas in a reactor into liquid hydrocarbons, and optionally solid hydrocarbons and optionally liquefied petroleum gas, at elevated temperatures and pressures; using a catalyst as defined herein.

The production of liquid hydrocarbons with a catalyst according to the present invention may be conducted in an immobilised slurry reactor, an ebullating bed reactor or a multitubular fixed bed reactor, preferably a multitubular fixed bed reactor.

The Fischer-Tropsch process is well known to those skilled in the art and involves synthesis of hydrocarbons from syngas, by contacting the syngas at reaction conditions with the Fischer-Tropsch catalyst. The synthesis gas can be provided by any suitable means, process or arrangement. This includes partial oxidation and/or reforming of a hydrocarbonaceous feedstock as is known in the art.

To adjust the $H_2/CO$ ratio in the syngas, carbon dioxide and/or steam may be introduced into the partial oxidation process. Preferably up to 15% volume based on the amount of syngas, preferably up to 8% volume, more preferably up to 4% volume, of either carbon dioxide or steam is added to the feed. Water produced in the hydrocarbon synthesis may be used to generate the steam. As a suitable carbon dioxide source, carbon dioxide from the effluent gasses of the expanding/combustion step may be used. The $H_2/CO$ ratio of the syngas is suitably between 1.5 and 2.3, preferably between 1.6 and 2.0. If desired, (small) additional amounts of hydrogen may be made by steam methane reforming, preferably in combination with the water gas shift reaction. Any carbon monoxide and carbon dioxide produced together with the hydrogen may be used in the gasification and/or hydrocarbon synthesis reaction or recycled to increase the carbon efficiency. Hydrogen from other sources, for example hydrogen itself, may be an option.

The syngas comprising predominantly hydrogen, carbon monoxide and optionally nitrogen, carbon dioxide and/or steam is contacted with a suitable catalyst in the catalytic conversion stage, in which the hydrocarbons are formed. Suitably at least 70 v/v % of the syngas is contacted with the catalyst, preferably at least 80%, more preferably at least 90%, still more preferably all the syngas.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Products of the Fischer-Tropsch synthesis may range from methane to heavy paraffin waxes. Preferably, the production of methane is minimized and a substantial portion of the hydrocarbons produced have a carbon chain length of a least 5 carbon atoms. Preferably, the amount of $C_{5+}$ hydrocarbons is at least 60% by weight of the total product, more preferably, at least 70% by weight, even more preferably, at least 80% by weight, most preferably at least 85% by weight.

The hydrocarbons produced in the process are suitably $C_{3-200}$ hydrocarbons, more suitably $C_{4-150}$ hydrocarbons, especially $C_{5-100}$ hydrocarbons, or mixtures thereof. These hydrocarbons or mixtures thereof are liquid or solid at temperatures between 5 and 30° C. (1 bar), especially at about 20° C. (1 bar), and usually are paraffinic of nature, while up to 30 wt %, preferably up to 15 wt %, of either olefins or oxygenated compounds may be present.

Depending on the catalyst and the process conditions used in a Fischer-Tropsch reaction, various proportions of normally gaseous hydrocarbons, normally liquid hydrocarbons and optionally normally solid hydrocarbons are obtained. It is often preferred to obtain a large fraction of normally solid hydrocarbons. These solid hydrocarbons may be obtained up to 90 wt % based on total hydrocarbons, usually between 50 and 80 wt %.

A part may boil above the boiling point range of the so-called middle distillates. The term "middle distillates", as used herein, is a reference to hydrocarbon mixtures of which the boiling point range corresponds substantially to that of kerosene and gasoil fractions obtained in a conventional atmospheric distillation of crude mineral oil. The boiling point range of middle distillates generally lies within the range of about 150 to about 360° C.

The higher boiling range paraffinic hydrocarbons, if present, may be isolated and subjected to a catalytic hydrocracking step, which is known per se in the art, to yield the desired middle distillates.

Further, any catalytic hydrocracking reaction, regardless of the source of the hydrocarbons, may be performed with a catalyst in accordance with the present invention. Thus according to one embodiment of the invention, there is provided a process of cracking hydrocarbons using a catalyst as defined herein.

The catalytic hydrocracking is carried out by contacting the paraffinic hydrocarbons at elevated temperature and pressure and in the presence of hydrogen with a catalyst as described herein.

The amount of catalytically active noble metal present in the hydrocracking catalyst may vary within wide limits and is typically in the range of from about 0.05 to about 5 parts by weight per 100 parts by weight of the support material. The amount of non-noble metal present is preferably 5-60 parts by weight per 100 parts by weight of the support material, preferably 10-50.

Suitable conditions for the catalytic hydrocracking are known in the art. Typically, the hydrocracking is effected at a temperature in the range of from about 175 to 400° C. Typical hydrogen partial pressures applied in the hydrocracking process are in the range of from 10 to 250 bar.

Certain embodiments of the present invention comprise a Fischer-Tropsch process using a catalyst as described herein, and a hydrocracking step using a hydrocracking catalyst, the hydrocracking catalyst in accordance with the present invention. Other embodiments of the present invention comprise a Fischer-Tropsch process using a catalyst as described herein, and a hydrocracking step using a hydrocracking catalyst, the hydrocracking catalyst not in accordance with the present invention.

The product of the hydrocarbon synthesis and consequent hydrocracking suitably comprises mainly normally liquid hydrocarbons, beside water and normally gaseous hydrocarbons. By selecting the catalyst and the process conditions in such a way that especially normally liquid hydrocarbons are obtained, the product obtained ("syncrude") may be transported in the liquid form or be mixed with any stream of crude oil without creating any problems as to solidification and or crystallization of the mixture. It is observed in this respect that the production of heavy hydrocarbons, comprising large amounts of solid wax, are less suitable for mixing with crude oil while transport in the liquid form has to be done at elevated temperatures, which is less desired.

The invention also provides hydrocarbon products synthesised by a Fischer-Tropsch reaction and catalysed by a catalyst as defined herein. The invention also provides hydrocarbon products resulting from a hydrocracking reaction and catalysed by a catalyst as defined herein. The hydrocarbon products may have undergone the steps of hydroprocessing, preferably hydrogenation, hydroisomerisation and/or hydrocracking and may be a fuel, preferably naphtha, kerosene or gasoil, a waxy raffinate or a base oil.

Any percentage mentioned in this description is calculated on total weight or volume of the composition, unless indicated differently.

An embodiment of the invention will now be described by way of example only.

EXAMPLES

Catalyst structures in accordance with the present invention were formed using circular gauze rings with an inner diameter of 3 mm and an outer diameter of 7 mm. The wire gauze had 25600 openings per inch$^2$. Catalyst structures in accordance with the present invention were formed by spray-coating the gauze rings with a slurry comprising titania and a co-precipitate of cobalt and manganese hydroxide.

The refractory oxide (as refractory oxide) and cobalt hydroxide (as active metal precursor) made up about 40 wt % and 70 vol % of the resulting catalyst precursor structure. The total thickness of the resulting structure was less than 200 nm.

The catalyst structure was calcined and reduced, and then used in a Fischer Tropsch reaction in a fixed bed reactor. The resulting catalysts showed low diffusion limitations when used in a fixed bed reactor. The test results were compared to a conventional extruded trilobe catalyst. The relative results are shown in the table below.

| Catalyst | Cobalt Loading (wt %) | Activity (%) | Selectivity to $C_{5+}$ (%) | Selectivity to $CO_2$ (%) |
|---|---|---|---|---|
| Conventional Trilobe | 20 | Base | Base | Base |
| Catalyst Structure in accordance with the present invention | 8 | +10% | +6% | −77% |

The results in the table above clearly show the catalyst in accordance with the present invention to be superior over the control catalyst. This is especially marked given the lower cobalt content of the catalyst in accordance with the present invention. The activity and desired $C_{5+}$ selectivity have increased despite the lower cobalt content, and the unwanted $CO_2$ production has decreased significantly.

Advantages of certain embodiments of the invention are the higher activity, selectivity and lower $CO_2$ production resulting from catalytic reactions using these embodiments.

An advantage of certain embodiments of the invention is that the volume of the porous metal structure compared to the volume of the catalyst, is less than known catalysts comprising inert structures for support, thus saving on valuable reactor space.

The strength of embodiments of the invention was tested by a simple free fall test. A series of embodiments of the invention having a thickness of 0.3 mm were dropped from a height of 1 metre. No fines were observed.

In contrast comparative examples outside the scope of the present invention (with a thickness of 0.9 mm) that underwent the same test were completely destroyed—they disintegrated into many pieces.

These results are especially illustrative of the increased strength of the present invention because, not only did embodiments of the invention perform better than the comparative examples, but because the comparative examples had the extra strength of the increased thickness, and the embodiments of the present invention still performed better in this strength test.

Improvements and modifications may be made without departing from the scope of the invention.

We claim:

1. A catalyst carrier comprising:
    a support structure comprising a wire gauze having between $100^2$ to $600^2$ openings per inch$^2$, and having a wire thickness in the range of 20 micrometer to 110 micrometer; and
    a refractory metal oxide;
    wherein the volume of the support structure is less than 50% of the volume of the catalyst carrier and at least 70% of said openings are filled with the refractory metal oxide.

2. A catalyst carrier as claimed in claim 1 wherein the support structure is less than 30% of the volume of the catalyst carrier.

3. A catalyst carrier as claimed in claim 1 wherein the gauze structure comprises stainless steel, iron, copper and/or aluminum.

4. A catalyst carrier as claimed in claim 1 wherein at least 70 vol % of the support structure is embedded by the refractory metal oxide.

5. A catalyst carrier as claimed in claim 1 which is provided as one or more strips with a length of at least four times the width.

6. A catalyst carrier as claimed in claim 1 which is provided in the shape of a ring.

7. A catalyst carrier as claimed in claim 1 wherein more than 80% of the openings in the support structure, before combination with the refractory oxide, have a size which is within 5% of the average opening size.

8. A catalyst or catalyst precursor comprising:
    a support structure comprising a wire gauze having between $100^2$ to $600^2$ openings per inch$^2$, and having a wire thickness in the range of 20 micrometer to 110 micrometer; and
    a refractory metal oxide; and
    a catalytically active metal or precursor therefor;
    wherein the volume of the support structure is less than 50% of the volume of the catalyst carrier and at least 70% of said openings are filled with the refractory metal oxide.

9. A catalyst or catalyst precursor as claimed in claim 8 wherein the support structure is less than 30% of the volume of the catalyst carrier.

10. A catalyst or catalyst precursor as claimed in claim 8 wherein the gauze structure comprises stainless steel, iron, copper and/or aluminum.

11. A catalyst or catalyst precursor as claimed in claim 8 wherein at least 70 vol % of the support structure is embedded by the refractory metal oxide.

12. A catalyst or catalyst precursor as claimed in claim 8 which is provided as one or more strips with a length of at least four times the width.

13. A catalyst or catalyst precursor as claimed in claim 8 which is provided in the shape of a ring.

14. A catalyst or catalyst precursor as claimed in claim 8 wherein more than 80% of the openings in the support structure, before combination with the refractory oxide, have a size which is within 5% of the average opening size.

* * * * *